(No Model.)
W. L. JOHNSON.
SALT BOX OR CELLAR.
No. 494,205. Patented Mar. 28, 1893.
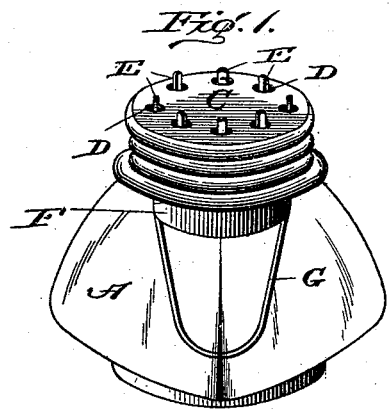
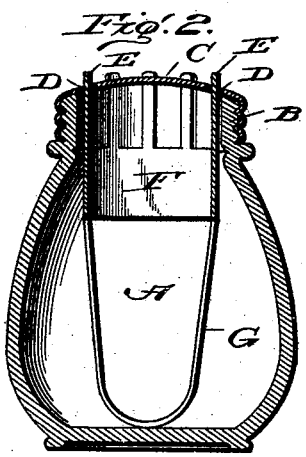
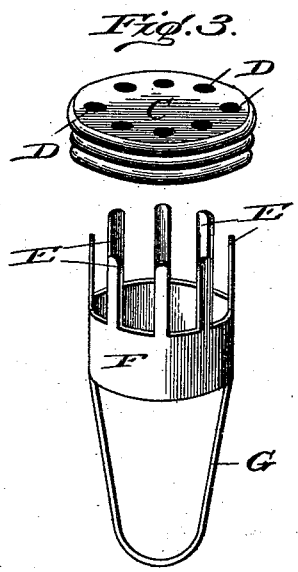

UNITED STATES PATENT OFFICE.

WILLIAM L. JOHNSON, OF POMONA, CALIFORNIA, ASSIGNOR OF ONE-HALF TO ROBERT FRANKEN, OF SAME PLACE.

SALT BOX OR CELLAR.

SPECIFICATION forming part of Letters Patent No. 494,205, dated March 28, 1893.

Application filed July 20, 1892. Serial No. 440,654. (No model.)

*To all whom it may concern:*

Be it known that I, WILLIAM L. JOHNSON, a citizen of the United States, residing at Pomona, in the county of Los Angeles and State of California, have invented certain new and useful Improvements in Salt Boxes or Cellars; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is an improved and novel salt cellar or box, and the object of my invention is the provision of a box or cellar for salt, pepper or spices, although specially adapted for salt which will entirely prevent the salt from clogging the discharge openings and which will be simple and inexpensive in construction, thus possessing the features of merit calculated to commend it as useful for the intended purpose.

To attain the desired object the invention consists of a salt box or cellar having a detachable cap or top provided with a series of discharge openings around the edge thereof and a device for keeping the salt in a powdered or granulated condition and preventing the discharge openings from clogging, and also in certain novel features of construction and arrangement of parts as will fully appear from the drawings and description.

Figure 1 represents a perspective view of a salt box or cellar constructed in accordance with and embodying my invention. Fig. 2 represents a vertical sectional view thereof, and Fig. 3 represents a detail view of the cover and agitator.

Referring by letter to the drawings—A designates the salt box or cellar which may be of any size, shape or design and of any preferred material, preferably having the threaded mouth B, to receive the cap or top C. This cap or top is provided with a series of discharge openings D which are arranged around the top in a circle and preferably near the edge of the top, and through these openings pass the tines or teeth E, carried by the band or ring F, which also has the depending bail or yoke G, the whole being what is best termed an agitator or breaker for keeping the salt in a powdered or granulated condition. The bail or yoke is of such a length as to reach nearly or to the base or bottom of the cellar and the teeth or tines thereon are consequently always in the openings of the top or cap, and it is evident that the movement or shaking of the cellar moves the agitator which breaks the salt and the playing of the tines in the openings always keeps the said openings free so that the salt cannot clog. The passing of the tines through the discharge openings in connection with the yoke which breaks the salt is of much importance as the tines always keep the openings free and the agitator has the proper play to break or keep the salt in proper condition.

My improved salt cellar or box presents an ornamental and attractive appearance and can be easily taken apart for purposes of filling and cleaning; the agitator will never fail to prevent clogging and the cellar can be produced at a very low price, thus placing within reach of all a useful and economical device.

I claim as my invention—

1. A salt box or cellar, consisting of the box or cellar, a top fitting on said cellar and provided with a series of discharge openings and an agitator in said box or cellar having a series of teeth or tines adapted to pass through the discharge openings and prevent clogging thereof and a depending loop which serves as a breaker and normally rests on the bottom of the cellar to keep the tines always in the discharge openings of the top, for the purpose described.

2. A salt cellar or box, consisting of a box or cellar proper, a top carried by said cellar or box and having discharge openings, and an agitator consisting of a ring or band having a depending breaking portion and teeth or tines for clearing the discharge openings of the top, said depending breaking portion normally resting on the bottom of the cellar and causing the tines to always project through the discharge openings, as and for the purpose described.

In testimony whereof I affix my signature in presence of two witnesses.

WILLIAM L. JOHNSON.

Witnesses:
JNO. MCCARY,
JAS. BEEKET.